United States Patent
Robison et al.

(10) Patent No.: US 7,021,328 B2
(45) Date of Patent: Apr. 4, 2006

(54) NO INTERRUPT SERVICE TEE AND METHOD

(75) Inventors: David L. Robison, Ashtabula, OH (US); Gregory Alan Brzozowski, Hicksville, NY (US); Mario Carbone, Bayside, NY (US)

(73) Assignee: Keyspan Corporation, Brooklyn, NY (US)

( * ) Notice: Subject to any disclaimer, the term of this patent is extended or adjusted under 35 U.S.C. 154(b) by 111 days.

(21) Appl. No.: 10/641,699

(22) Filed: Aug. 15, 2003

(65) Prior Publication Data

US 2004/0050421 A1 Mar. 18, 2004

Related U.S. Application Data

(63) Continuation of application No. 09/611,142, filed on Jul. 6, 2000, now Pat. No. 6,612,330.

(51) Int. Cl.
*F16K 43/00* (2006.01)

(52) U.S. Cl. .................................. 137/318; 408/137
(58) Field of Classification Search ............... 137/318, 137/15.14; 408/137
See application file for complete search history.

(56) References Cited

U.S. PATENT DOCUMENTS

| | | | |
|---|---|---|---|
| 2,002,383 A | 5/1935 | Witt | |
| 2,171,576 A | 9/1939 | Larry et al. | |
| 2,171,937 A | 9/1939 | Larry et al. | |
| 2,171,942 A | 9/1939 | Mueller | |
| 2,171,943 A | 9/1939 | Mueller | |
| 2,237,476 A | 4/1941 | Cline | |
| 2,756,486 A | 7/1956 | Smith | |
| 2,763,282 A | 9/1956 | Ready et al. | |
| 2,767,600 A | 10/1956 | Mueller et al. | |
| 3,240,227 A | 3/1966 | Burkholder | |
| 3,252,474 A | 5/1966 | Ehrens et al. | |
| 3,845,789 A | 11/1974 | Rohrer | |
| 4,029,118 A | 6/1977 | Merideth | |
| 4,076,038 A | 2/1978 | Wynne | |
| 4,258,742 A | 3/1981 | Louthan et al. | |
| 4,337,788 A | 7/1982 | Seger | |
| 4,351,349 A | 9/1982 | Minotti | |

(Continued)

FOREIGN PATENT DOCUMENTS

JP 6-137482 5/1994

*Primary Examiner*—Kevin Lee
(74) *Attorney, Agent, or Firm*—Fay, Sharpe, Fagan, Minnich & McKee, LLP

(57) ABSTRACT

A method of replacing a gas main that supplies gas to a recipient through an existing service line includes connecting a first tapping tee to the new gas main and connecting a second tapping tee to the existing service line that communicates with a downstream recipient. Branch passages of the first and second tapping tees are fluidically connected together by a connecting conduit. The new gas main is then tapped with the first tee so that gas flows from the new gas main into the connecting conduit up to the second tee. All air is bled from the connecting conduit between the first and second tees, and the existing service line is then tapped with the second tee so that gas is supplied to the recipient through both the existing service line and the connecting conduit. Gas flow to the recipient from the old main is then terminated. The second tee is a specially configured tapping tee specifically adapted for bleeding air from the connecting conduit that interconnects the first and second tees. This tee also utilizes a non-cylindrical bore for holding the conduit to be tapped to inhibit collapsing of the conduit during tapping operations.

17 Claims, 7 Drawing Sheets

U.S. PATENT DOCUMENTS

| | | |
|---|---|---|
| 4,355,656 A | 10/1982 | Smith |
| 4,437,494 A | 3/1984 | Soper et al. |
| 4,719,936 A | 1/1988 | Tsubakimoto et al. |
| 4,730,636 A * | 3/1988 | Volgstadt et al. ........ 137/15.14 |
| 4,926,898 A | 5/1990 | Sampey |
| 5,052,431 A | 10/1991 | Jiles |
| 5,054,512 A | 10/1991 | Jiles |
| 5,062,207 A | 11/1991 | Martin et al. |
| 5,074,526 A | 12/1991 | Ragsdale et al. |
| 5,076,318 A | 12/1991 | Fedora |
| 5,360,241 A | 11/1994 | Gundy |
| 5,425,395 A | 6/1995 | Brennan |
| 5,577,709 A | 11/1996 | Gugala et al. |
| 5,590,680 A | 1/1997 | Gugala et al. |
| 5,778,919 A | 7/1998 | Petrone |
| 5,829,474 A | 11/1998 | Bolender |
| 5,842,496 A | 12/1998 | Delanty et al. |
| 6,012,475 A * | 1/2000 | Taylor et al. ................ 408/137 |
| 6,260,573 B1 * | 7/2001 | Lehmann et al. ........... 137/318 |

* cited by examiner

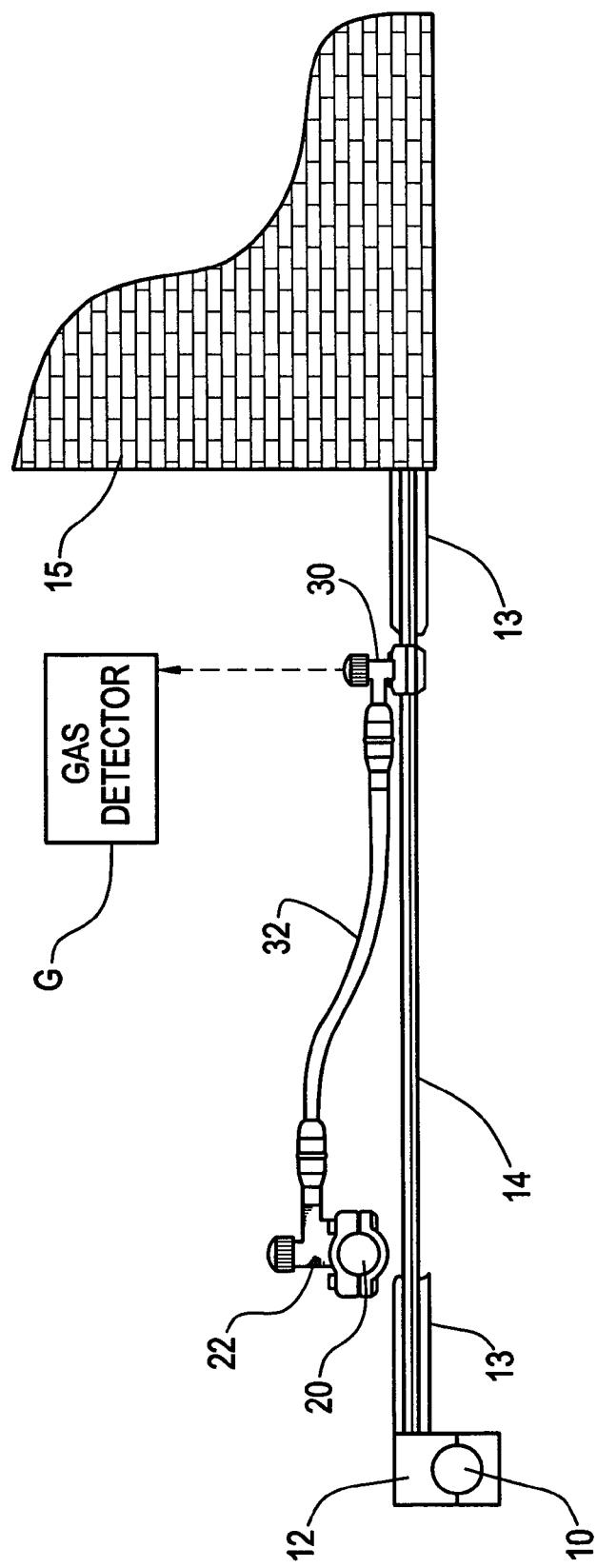

NO INTERRUPT SERVICE TEE AND METHOD

CROSS-REFERENCE TO RELATED APPLICATION

This application is a continuation of application Ser. No. 09/611,142 filed Jul. 6, 2000, now U.S. Pat. No. 6,612,330.

BACKGROUND OF THE INVENTION

The present invention relates generally to the art of tapping conduits and, more particularly, to the art of tapping mains and service lines for purposes of replacing same without interrupting service. The invention will be described in connection with gas mains and service lines, but those of ordinary skill in the art will quickly recognize that the invention has broader application to other mains and service lines, especially those designed to supply a fluid to a recipient in a non-interruptible fashion.

In the installation of new natural gas mains, it is typical to bury the new main in the desired location (usually in parallel with an existing main) and thereafter connect the existing or new service lines thereto for purposes of supplying gas to recipients by way of respective service lines. FIG. 1 illustrates a prior installation for the transmission of natural gas from a buried main conduit 10 to a home, business or other recipient 15. Gas is withdrawn from the main 10 through a main tee 12, and a gas service line 14 fluidically connects the branch passage of the main tee 12 to the recipient 15, typically by way of a meter (not shown). Because older gas mains and older service lines were typically fabricated from iron, these elements corrode and must be replaced. In each case, plastic conduit is a preferred replacement.

Often, the gas service line 14 is a plastic conduit that has been inserted into a preexisting iron or other metallic service line conduit 13 for the purpose of "insert-renewing" the gas service to the recipient 15. In such an operation, the plastic conduit 14 is slidably inserted into the existing conduit 13 from the recipient end and the distal end of the plastic conduit is sealingly engaged with the existing metallic conduit adjacent the main 10 to prevent gas flow between the existing and new service line conduits. This insert-renewing operation has been found to be a highly effective and convenient means for replacing an obsolete service line conduit 13.

Heretofore, installation of a new main has involved simply cutting or blocking the relevant conduits and inserting the new conduits into the gas-flow circuit via tapping tees. For example, with continuing reference to FIG. 1, the service line 14 could be severed at the point 18 and thereafter connected to a new main. This, of course, interrupts service to recipients downstream relative to the cut 18. With gas transmission systems, interruption of service results in the extinguishment of pilot lights, and these must be re-lit by service personnel when gas service is restored. Furthermore, a significant amount of air often enters the gas transmission circuit and must be bled before the pilot lights will remain lit. The interruption of gas service during the main and/or service line replacement operation is highly undesirable and adds expense and inconvenience to the operation while lengthening the time recipients are without service.

Another deficiency associated with respect to prior main and/or service line replacement is that prior tapping tees are not well-suited for use on small-diameter plastic conduit, e.g., conduit with less than a two inch outer diameter. With conventional tapping tees, such conduit sometimes partially collapses during the tapping operation, and this prevents the formation of a good seal between the body of the tapping tee and the outer surface of the conduit.

In light of the foregoing specifically noted deficiencies and others associated with convention tapping tees and methods, it has been deemed desirable to provide a new and improved tapping tee and method that overcome these deficiencies and that provide better overall results.

SUMMARY OF THE INVENTION

In accordance with a first aspect of the present invention, a method of replacing an existing gas main that supplies gas to a recipient through an existing service line includes connecting a first tapping tee to a new gas main and connecting a second tapping tee to the existing service line. The first and second tapping tees are then fluidically interconnected with an interconnecting service line, and the new gas main is tapped with the first tee so that gas flows from the new gas main into the interconnecting service line up to the second tee. All air is then bled from the interconnecting service line between the first and second tees, and thereafter the existing service line is tapped with the second tee so that gas is supplied to the recipient through both the existing service line and the interconnecting service line. Gas flow to the recipient from the existing main is then terminated with no interruption of gas service to the recipient.

In accordance with another aspect of the invention, a tapping method for supplying fluid to a recipient from a new pressurized fluid main without interruption of service from an existing main and service conduit includes connecting a first conduit tap to a new pressurized fluid main, and connecting a second conduit tap to an existing service conduit in fluid communication with a downstream recipient. The first and second taps are fluidically interconnected with a connecting conduit, and the new pressurized fluid main is tapped with the first conduit tap. A bleed passage in the second tap is opened and fluid is bled from the new pressurized fluid main and connecting conduit until a desired bleed output is detected. The bleed passage is then closed and the existing service conduit is tapped with the second conduit tap.

In accordance with a further aspect of the present invention, a tapping tee includes a body member defining: (i) an internal threaded passage; and, (ii) a conduit-receiving bore in fluid communication with the internal passage. A cutter has an externally threaded region that cooperates with the threaded passage of the body member for advancing and retracting the cutter in response to its rotation, and the cutter further includes a cutting edge at a first end adapted to cut an opening in a conduit secured in the bore. The tee includes a branch passage in fluid communication with the internal threaded passage, and a selectively openable bleed passage for venting the branch passage to a location exterior of the tapping tee.

One advantage of the present invention is the provision of a no interrupt service tapping method for replacing gas mains and/or service lines without interrupting service to a downstream recipient.

Another advantage of the present invention resides in the provision of a gas line replacement method wherein the pilot lights in gas recipient's appliances are not extinguished and need not be re-lit after the gas line replacement operation.

A further advantage of the present invention is the provision of a gas line replacement method wherein one hundred percent gas is delivered to the recipient through the new gas line immediately upon gas being delivered to the recipient through the new gas line.

Still another advantage of the present invention resides in the provision of an improved tapping tee specifically adapted for use in tapping relatively small diameter plastic conduit without collapsing same.

A still further advantage of the present invention is found in the provision of a tapping tee with a separate O-ring retainer.

A yet further advantage of the present invention resides in the provision of a tapping tee specifically adapted for tapping relatively small diameter plastic conduit, wherein the body of the tapping tee defines an ovalized bore for receipt of the conduit to be tapped, with the major (longer) axis of the bore arranged parallel to the tapping axis.

Another advantage of the present invention is found in the provision of a tapping tee that is specifically adapted for facilitating a gas bleeding operation.

Still other benefits and advantages of the present invention will become apparent to those of ordinary skill in the art to which the invention pertains upon reading and understanding the following specification.

BRIEF DESCRIPTION OF THE DRAWINGS

The invention can take form in a variety of components and arrangements of components, and from a variety of steps and arrangements of steps, preferred embodiments of which are disclosed in the accompanying drawings that form a part hereof and wherein:

FIG. 2 illustrates the installation of FIG. 1 and further shows a new gas main and service line partially installed in accordance with the present invention;

DETAILED DESCRIPTION OF PREFERRED EMBODIMENTS

Figure 1:
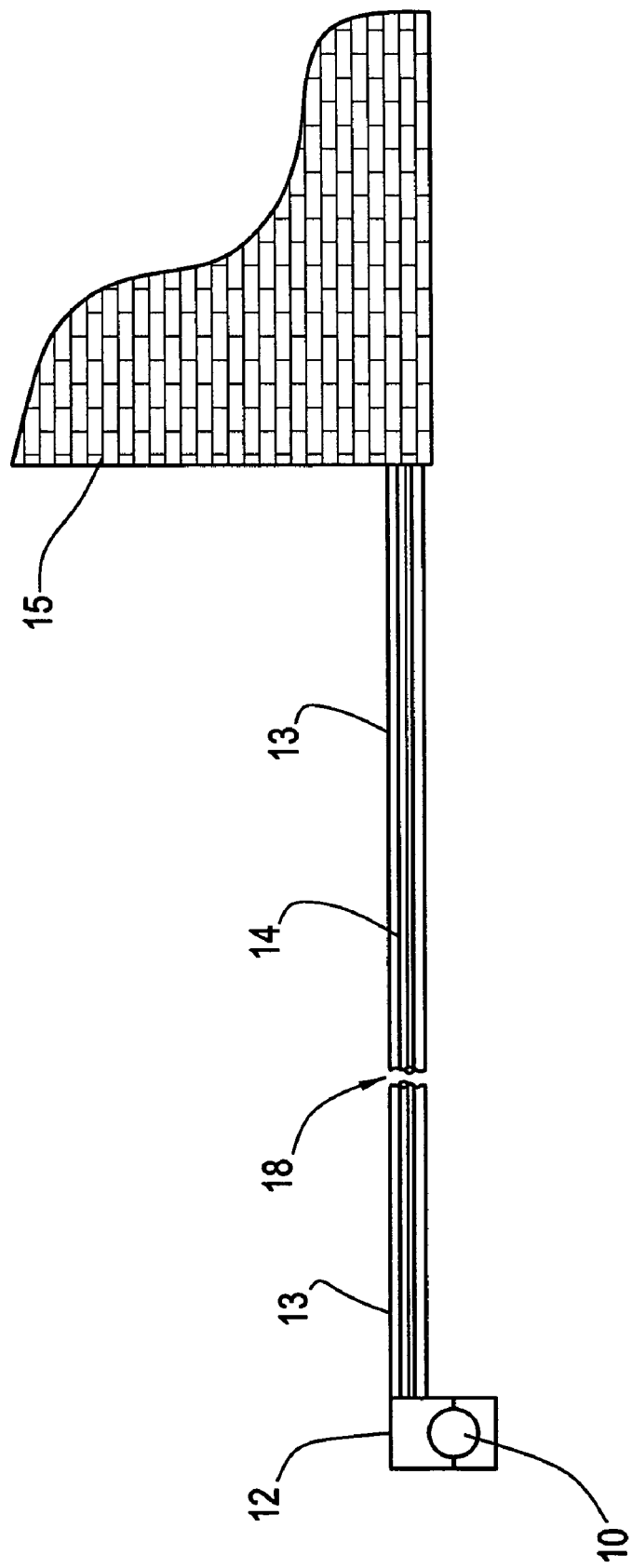
FIG. 1 is a diagrammatic illustration of a conventional prior art gas main and service line installation.

Referring now to FIGS. 2–8 of the drawings, wherein the showing are for purposes of disclosing preferred embodiments only and not for purposes of limiting same, FIG. 2 illustrates the previously described conventional gas installation, along with a replacement main conduit 20 and interconnecting service line conduit 32 that are intended to replace the existing main 10 and part of the existing service line 14, respectively. With reference also to the flow-chart of FIG. 8, the method comprises a step S1 of installing a tapping tee 22 on the new main 20, without tapping the new main. The method further comprises a step S2 of installing a second, specially configured "No Interrupt Service Tee" (NIST) 30 (described below) on the existing service line 14, preferably at a location adjacent the recipient 15 (the outer, metallic conduit 13, if any, is removed from the existing plastic service line conduit 14 as needed for access to the plastic service line conduit 14). Here, again, the tee 30 is not yet used to tap the service line 14. The subject method further comprises a step S3 of fluidically interconnecting the branch passages of the tees 22,30 by way of an interconnecting service line conduit 32.

At this stage, gas is still being provided to the recipient by way of the existing main 10 and service line 14. Further, the new main 20 is pressurized with gas. Prior to tapping the new main 20 with the tee 22 or the service line 14 with the tee 30, these tees are pressure tested to ensure they are properly installed and seated on their respective conduits. If either tee 22,30 fails the pressure test, it must be adjusted or reinstalled on the relevant conduit before the method proceeds.

The method further comprises a step S4 of using the tee 22 to tap the new main 20 so that gas will flow into the interconnecting service line 32 up to the tee 30. Of course, a mixture of gas from the new main 20 and air from the interconnecting service line 32 will be trapped in the interconnecting service line. Accordingly, the method further comprises the step S5 of bleeding the interconnecting service line 32 using the NIST tee 30 as described in further detail below. A gas detector G is preferably used to determine when the interconnecting service line 32 is air-free, i.e., when 100% gas is being bled from the tee 30. When 100% gas is detected by the gas detector G, the bleeding operation S5 is terminated.

Figure 3A:
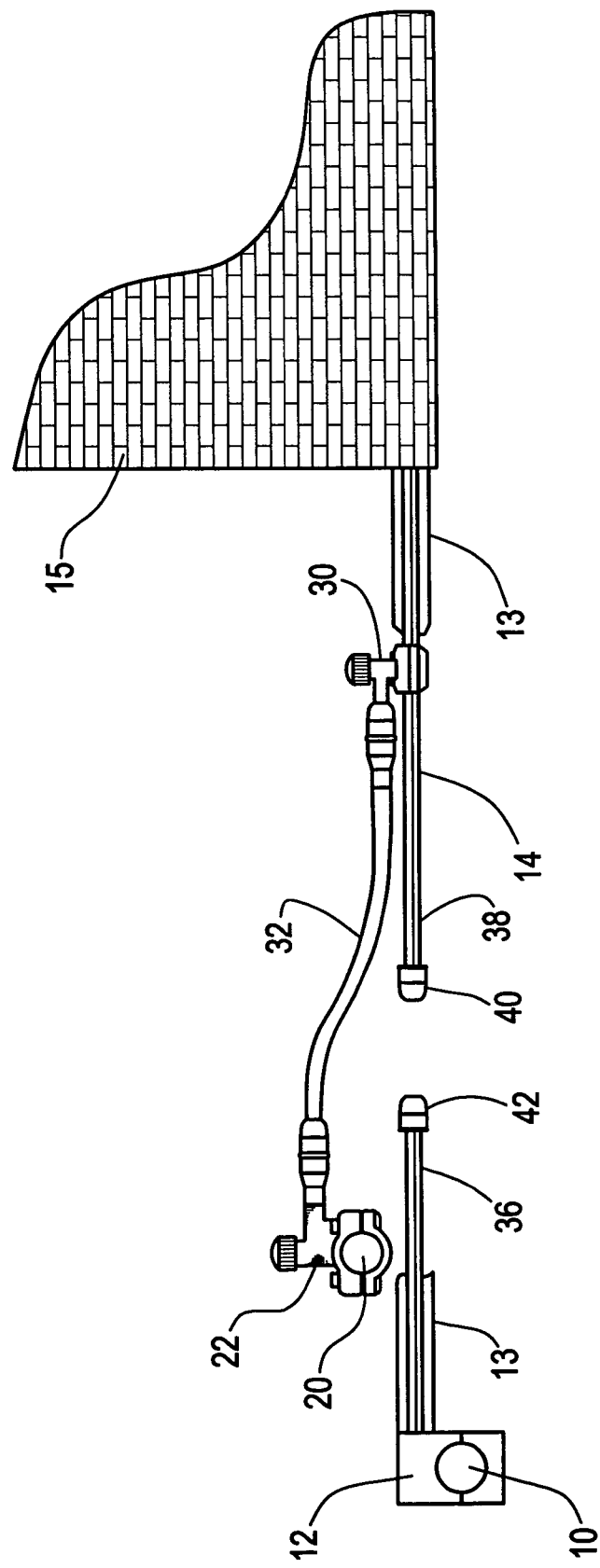
FIG. 3A is similar to FIG. 2, but the new gas main and service line are fully installed and the old service line is rendered inoperative.
Figure 3B:
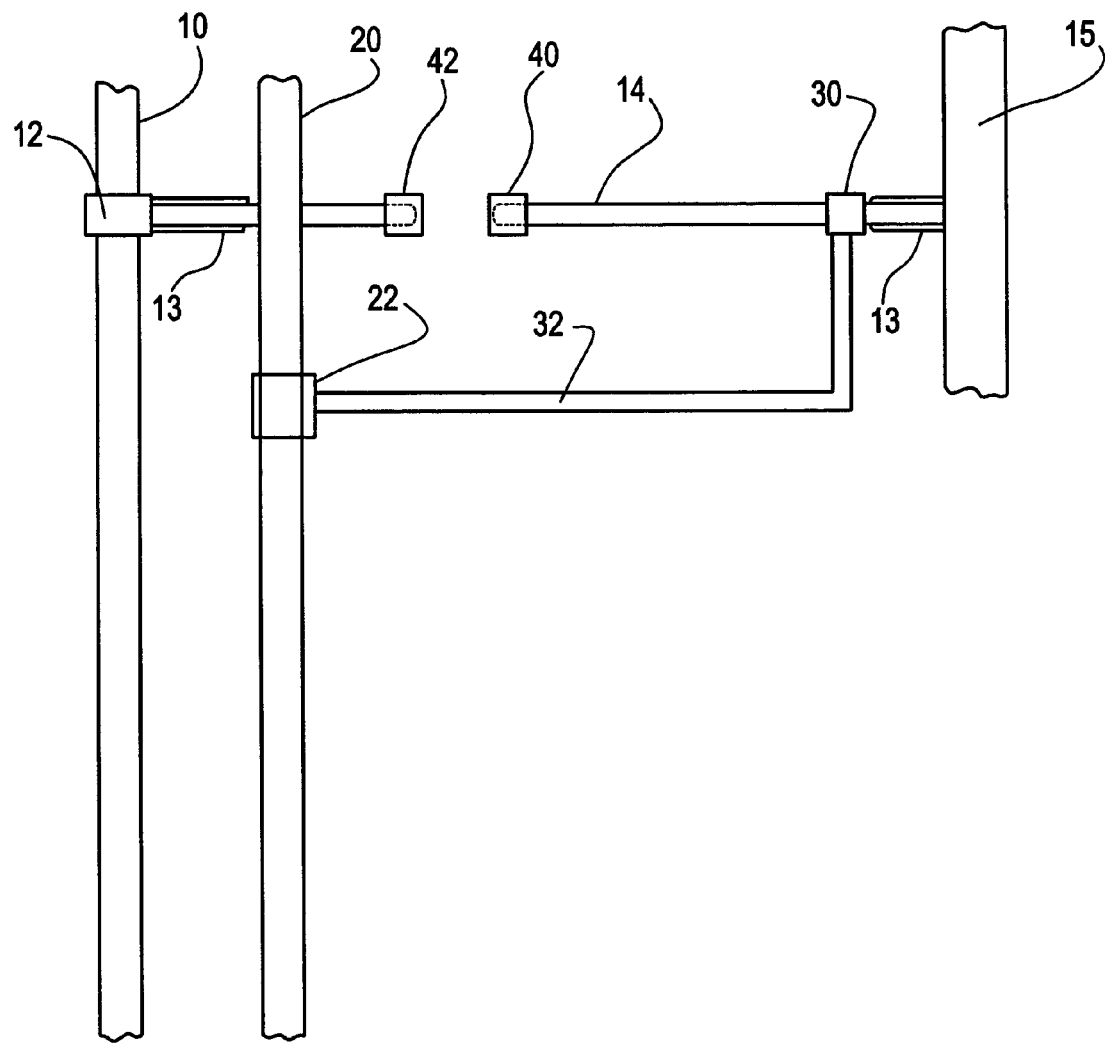
FIG. 3B is a top plan view of the installation of FIG. 3A.

The method further comprises the step S6 of using the tee 30 to tap the existing service line 14 so that gas is supplied to the recipient 15 via both the existing main 10 and service line 14 and the new main 20 and interconnecting service line 32 (and any portion of the existing service line 14 downstream relative to the tee 30). Those of ordinary skill in the art will now appreciate that the supply of gas from the existing main 10 and the existing service line 14 (upstream from the tee 30) can be terminated by a pinching, cutting, and/or capping operation as desired without interrupting gas service to the recipient 15. For example, as illustrated in FIG. 3A, the existing service line 14 is cut or pinched off at a location 36 between the existing main 10 and the new tapping tee 30. Preferably, the existing service line 14 is also cut or pinched at a second location 38 between the cut or pinch location 36 and the tee 30. Caps 40,42 are installed on the open conduit ends resulting from the cuts 38,36 to seal same.

Figure 4:
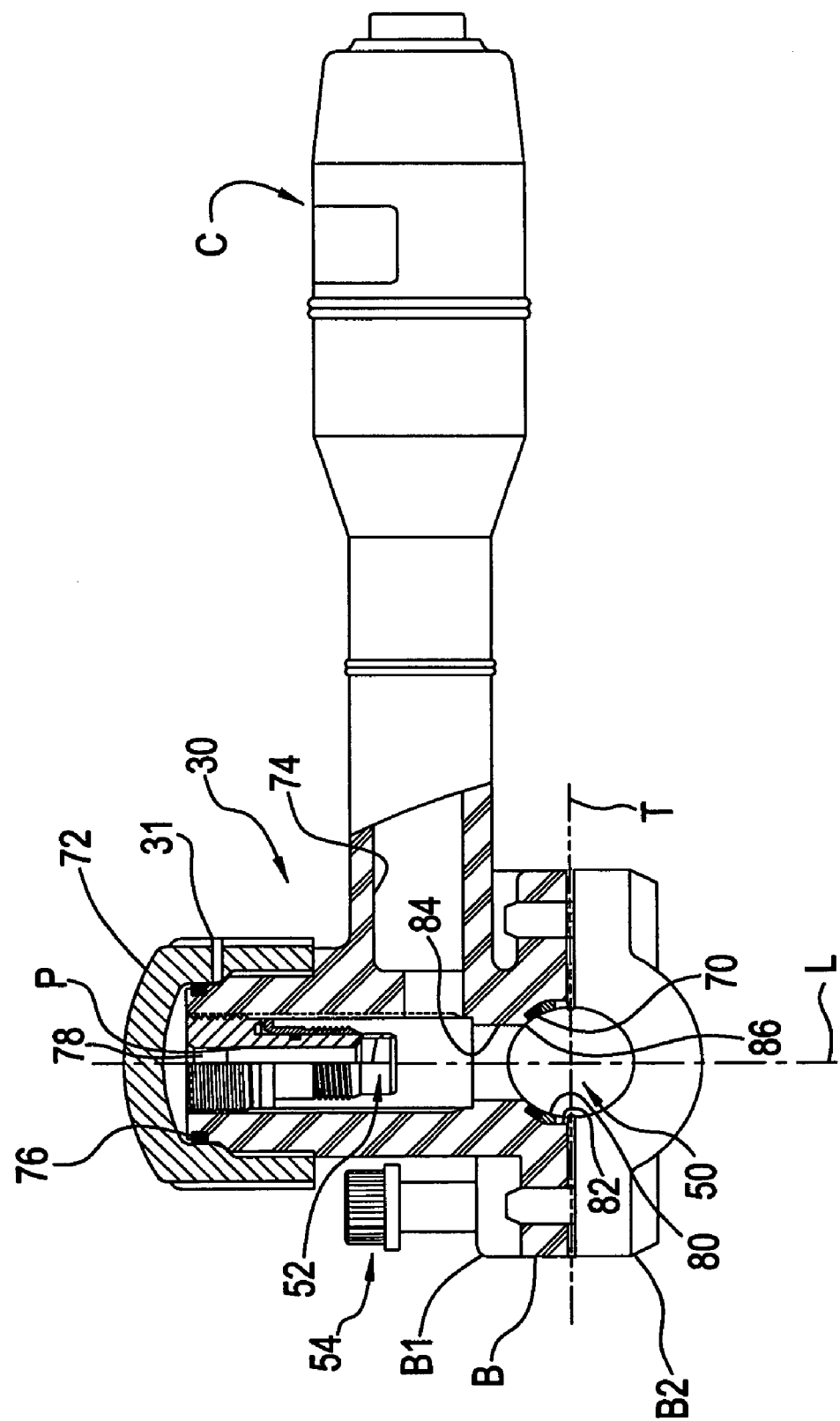
FIG. 4 is a side view, partially in section and partially in elevation, of an improved tapping tee formed in accordance with the present invention.

The tapping tees 12,22 can be any suitable conventional tapping tees as are well known in the art. As noted, the tapping tee 30 (NIST) must be specially configured to accomplish the bleeding operation S5. The tapping tee 30 is preferably formed substantially in accordance with the tee disclosed in commonly owned U.S. Pat. No. 5,425,395, the disclosure of which is expressly hereby incorporated by reference herein. The tee 30 is shown in FIG. 4 of the present application and, except as illustrated and described herein, is identical to that disclosed in the aforementioned U.S. Pat. No. 5,425,395.

The tee 30 is specifically adapted for use in tapping relatively small diameter plastic conduit such as that having an outer diameter of less than about two inches. Specifically, unlike the tee disclosed in U.S. Pat. No. 5,425,395, the body B of the tee 30 (comprising upper and lower separable portions B1,B2 adapted for saddle-like placement about a conduit) defines a non-cylindrical, ovalized bore 50 for receiving and retaining a plastic conduit to be tapped. Thus, the bore 50 is defined so as not to conform to the cylindrical outer surface of a conventional plastic conduit to be tapped with the tee 30.

The ovalized bore 50 is preferably defined by a major (longer) axis parallel to the axis L along which the tapping cutter assembly 52 moves during tapping operations. The ovalized bore 50 is also defined by a minor (shorter) axis that extends parallel to an axis T that lies transverse (preferably perpendicular) to the cutter axis L. Thus, those of ordinary skill in the art will recognize that when the body halves B1,B2 are fixedly secured about an associated conduit and secured using the bolts 54, the conduit held in the bore 50 will deform slightly and conform to the ovalized shape of the bore. Specifically, the associated conduit held in the bore 50 will deform so that it defines an arch that is directed against the direction of movement of the cutter assembly 52 during tapping operations whereby the cutter assembly penetrates the arched conduit, preferably at the crest of the arch. It has been found that, with the conduit ovalized in this manner, the cutting tip of the cutter assembly 52 is able to penetrate the conduit more easily and without undesirably deforming or collapsing the conduit which would result in leakage of combustible gas. Because the conduit will not deform under force from the cutter assembly 52, the seal 70 is better able to seat on the outer surface of the conduit.

Unlike the tee disclosed in U.S. Pat. No. 5,425,395, a gas-flow passage P is defined entirely through the cutter assembly 52. A portion of this passage P defines internal flats or the like 78 adapted for being drivingly engaged by a tool used to rotate and, thus, advance or retract the cutter assembly 52 on the axis L. With the presence of the passage P, gas can flow from the branch passage 74 through the cutter assembly 52 and out of the tee 30 through the tapping tower and a bleed port 31 defined in a cap 72 as described in full detail below. The cap 72 and O-ring 76 are used selectively to block undesired gas flow out of the tapping tower and bleed port 31 of the tee 30.

The surface defining the bore 50 comprises an O-ring retaining member 80 specifically adapted to secure the O-ring 70 in its operative position and to shape the O-ring 70 so that it conforms to the bore 50 whereby the O-ring 70 will sealingly engage the outer surface of a conduit held in the bore 50. The retainer 80 is adapted for placement in a recess 82 defined in the upper body member B1. When the retainer is connected to the upper body member B1 in this fashion, an annular groove is defined between the retainer 80 and a protruding annular lip 86 that surrounds the tapping bore 84, and this annular recess is specifically adapted for receiving and retaining the O-ring 70 therein so that the O-ring concentrically surrounds the lip 86 and bore 84.

Figure 5:
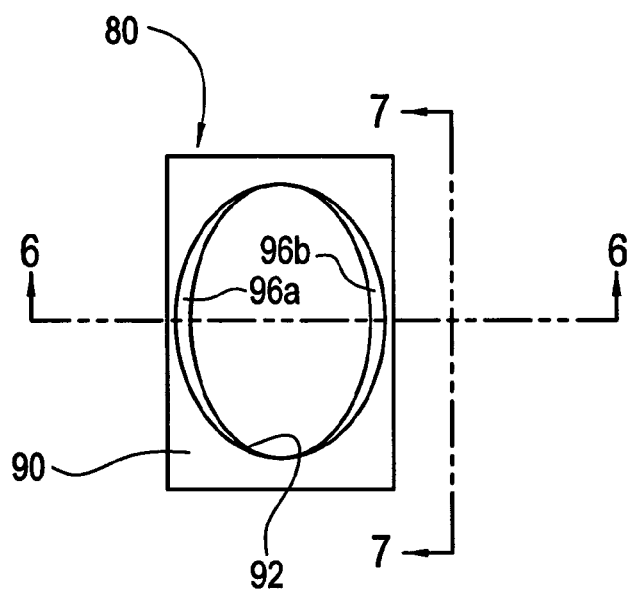
FIG. 5 is a top plan view of an O-ring retainer that forms a part of the tapping tee shown in FIG. 4.
Figure 6:
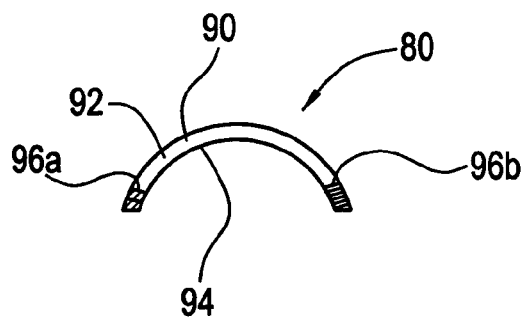
FIGS. 6 and 7 are views taken along lines 6—6 and 7—7, respectively, in FIG. 5; and, FIG. 8 is a flow chart that discloses a no interrupt service tapping method for main and service line replacement in accordance with the present invention.
Figure 7:
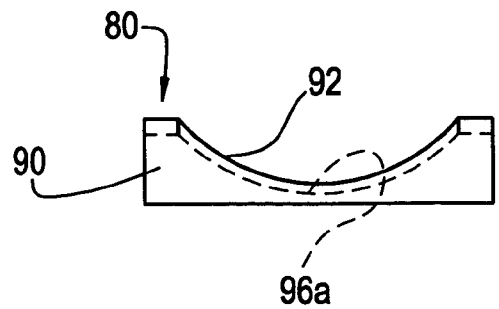
Figure 8:
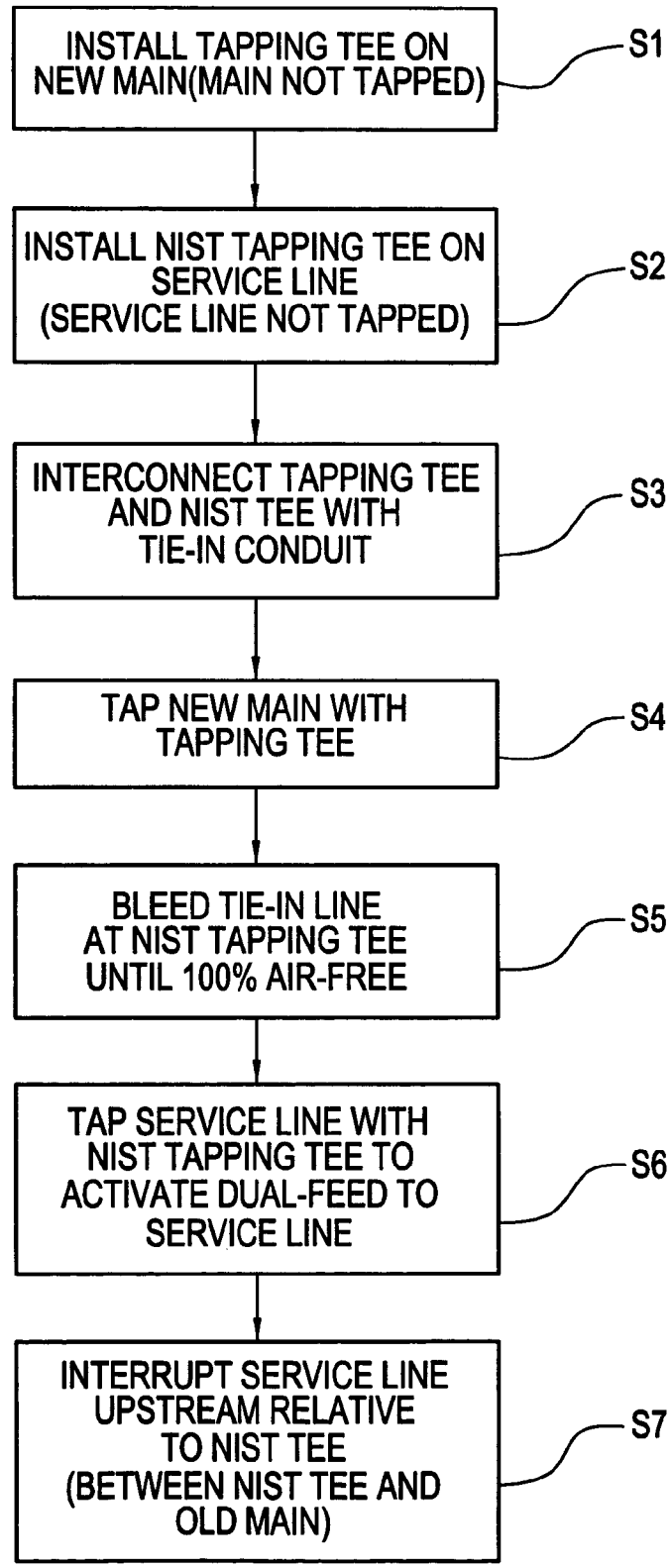

With reference to FIGS. 5–7, the O-ring retainer 80 is illustrated in further detail. It comprises a body 90 defined from a relatively thin (e.g., 0.09 inch) molded plastic material that is able to flex a limited amount. One suitable material is molded acetal copolymer. The retainer 80 defines a central aperture 92 adapted for receiving the projecting lip 86 of the body upper half B1 when the retainer is placed in the body recess 82. The inner surface 94 of the retainer is shaped so that, with the retainer operably installed in the recess 82, the inner surface 94 of the retainer defines a portion of the ovalized bore 50. Thus, the inner surface 94 of the retainer is not cylindrical.

The aperture 92 is defined in the retainer 80 in such a manner that first and second O-ring support surfaces 96a, 96b are defined on opposite lateral sides of the aperture 92. When the retainer is operably inserted into the recess 82, these surfaces 96a,96b are arranged in opposed facing relation with the projecting lip 86 and serve to trap the O-ring 70 against the lip so that no adhesive is required to secure the O-ring 70 in its operative position.

In line with the above-described tapping method, the tee 30 is installed with the existing service line 14 positioned in the bore 50 and with the interconnecting service line 32 fluidically connected with the branch passage 74 by way of a coupling C or other suitable means. Those of ordinary skill in the art will recognize that the bleeding step S5 of the above-described no interrupt service tapping method is conveniently accomplished simply by loosening the cap 72 of the NIST tee 30 and allowing gas to flow from the interconnecting service line 32 through the branch passage 74, through the tapping tower of the tee 30 by way of the passage P defined in the cutter assembly 52, and out through the bleed port 31 defined through the cap 72. For bleeding operations, the cap 72 must be loosened sufficiently so that the bleed port 31 is able to communicate with the passage P. When the cap 72 is again fully tightened or advanced to its closed position, gas flow out of the tee 30 through the passage P is prevented because fluid communication to the bleed port 31 is blocked by the O-ring 76. Of course, using the exact coupling described in U.S. Pat. No. 5,425,395, the same could be accomplished simply by removing the cap 72 and the cutter assembly (at least sufficiently for gas to flow therepast) for bleeding operations.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, what is claimed is:

1. A no interrupt service tapping tee comprising:
    a body including: (i) an internal threaded passage; and, (ii) a conduit-receiving region in fluid communication with the internal threaded passage;
    a cutter having an externally threaded region that cooperates with the internal threaded passage of the body, wherein said cutter is rotatable in said internal threaded passage for advancing and retracting the cutter, said cutter defining a gas flow passage therethrough;
    a branch passage in fluid communication with the internal threaded passage, wherein said gas flow passage defined through said cutter fluidically connects said conduit-receiving region with said branch passage;
    a seal surrounding an opening located at an intersection of said internal threaded passage with said conduit receiving region; and,
    a retainer member connected to said body and holding said seal in contact with said body.

2. A tapping tee comprising:
    a body comprising: (i) a tapping bore comprising internal threads; and, (ii) a conduit-receiving region in fluid communication with the tapping bore;
    a cutter that cooperates with the internal threads of the tapping bore so as to be selectively movable in said tapping bore, said cutter comprising a cutting edge at a first end adapted to cut an opening in an associated conduit secured in said conduit-receiving region;
    a branch passage in fluid communication with the tapping bore, wherein said cutter defines a gas flow passage that connects the conduit-receiving region to the branch passage;

an O-ring retainer connected to said body, said O-ring retainer defining an aperture that is aligned with said tapping bore, wherein said O-ring retainer and said body cooperate to define an O-ring seal-receiving recess; and, an O-ring seal positioned in said O-ring seal-receiving recess.

3. The tapping tee as set forth in claim 2, wherein said body comprises an annular lip that surrounds said tapping bore and wherein said seal-receiving recess is defined between said lip and said O-ring retainer.

4. The tapping tee as set forth in claim 2, wherein said body comprises separable upper and lower body portions that are selectively interconnected to define said conduit-receiving region, wherein said O-ring retainer is connected to said upper body portion and wherein said upper and lower body portions are selectively connectable to an associated conduit in a saddle-like arrangement.

5. The tapping tee as set forth in claim 2, wherein said O-ring retainer further comprises an inner surface that partially defines said conduit-receiving region.

6. The tapping tee as set forth in claim 2, wherein said O-ring retainer is defined as a one-piece molded polymeric construction.

7. The tapping tee as set forth in claim 2, further comprising:
a cap threadably secured to the body in selective blocking relation with the tapping bore.

8. The tapping tee as set forth in claim 2, wherein said aperture of said O-ring retainer is arranged concentric with said tapping bore.

9. The tapping tee as set forth in claim 6, wherein said one-piece O-ring retainer is flexible and conforms to an outer surface of an associated conduit located in said conduit-receiving region.

10. A tapping tee comprising:
a body comprising: (i) a tapping bore comprising internal threads; and, (ii) a conduit-receiving region in fluid communication with the tapping bore;
a cutter that cooperates with the internal threads of the tapping bore so as to be selectively movable in said tapping bore, said cutter comprising a cutting edge at a first end adapted to cut an opening in an associated conduit secured in said conduit-receiving region;
a branch passage in fluid communication with the tapping bore; and,
an O-ring retainer connected to said body, said O-ring retainer defining an aperture that is aligned with said tapping bore, wherein said O-ring retainer and said body cooperate to define an O-ring seal-receiving recess;
a cap threadably secured to the body in selective blocking relation with the tapping bore, wherein said cap defines a bleed passage that extends therethrough, wherein said cap is selectively advanceable and retractable relative to said body to open and close said bleed passage.

11. The tapping tee as set forth in claim 10, wherein said conduit-receiving region is non-cylindrical.

12. The tapping tee as set forth in claim 11, wherein said conduit-receiving region is ovalized and defined by a major axis and a minor axis.

13. The tapping tee as set forth in claim 12, wherein said major axis lies parallel to a longitudinal axis of said tapping bore.

14. A tapping tee comprising:
a body comprising: (i) a tapping bore comprising internal treads; and, (ii) a conduit-receiving region in fluid communication with the tapping bore;
a cutter that cooperates with the internal threads of the tapping bore so as to be selectively movable in said tapping bore, said cutter comprising a cutting edge at a first end adapted to cut an opening in an associated conduit secured in said conduit-receiving region, wherein said cutter comprises a flow passage defined therethrough;
a branch passage in fluid communication with the tapping bore; and,
an O-ring retainer connected to said body, said O-ring retainer defining an aperture that is aligned with said tapping bore, wherein said O-ring retainer and said body cooperate to define an O-ring seal-receiving recess.

15. The tapping tee as set forth in claim 14, wherein at least a portion of said flow passage defined through said cutter defines a driving surface adapted for being drivingly engaged by an associated tool for rotating said cutter in said tapping bore.

16. The tapping tee as set forth in claim 15, further comprising a hollow sleeve releasably connected to said cutter, said sleeve adapted for engaging and being fixedly secured to an associated conduit coaxially in an opening formed by said cutter when said cutter is advanced into the associated conduit.

17. A tapping tee comprising:
a body comprising upper and lower body portions that cooperate to define an ovalized non-cylindrical conduit-receiving region adapted for receipt of an associated conduit;
a cutter for selectively tapping an associated conduit located in said conduit-receiving region, said cutter located in and threadably engaged with a tapping bore defined by said upper body portion, wherein an annular projecting lip defined as part of said upper body portion surrounds said tapping bore where said tapping bore intersects said conduit-receiving region;
a branch passage in communication with said tanning bore;
an O-ring retainer connected to said upper body portion and partially defining said ovalized non-cylindrical conduit-receiving region, said upper body portion further defining a recess that surrounds said annular projecting lip, and said O-ring retainer located in said recess so that an annular seal-receiving space is defined between an opening defined in said O-ring retainer and said annular projecting lip of said upper body portion; and
an O-ring seal located in said seal-receiving space and retained in said seal-receiving space by said O-ring retainer.

* * * * *